United States Patent
Hockings

(10) Patent No.: US 11,938,692 B2
(45) Date of Patent: Mar. 26, 2024

(54) MATERIAL EXTRUDER

(71) Applicant: Commonwealth Scientific and Industrial Research Organisation, Acton (AU)

(72) Inventor: Nicholas Hockings, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 90 days.

(21) Appl. No.: 17/525,278

(22) Filed: Nov. 12, 2021

(65) Prior Publication Data
US 2022/0152953 A1    May 19, 2022

(30) Foreign Application Priority Data
Nov. 16, 2020 (AU) ................................. 2020904207

(51) Int. Cl.
*B29C 70/52*    (2006.01)
*B29C 70/54*    (2006.01)
(Continued)

(52) U.S. Cl.
CPC .......... *B29C 70/526* (2013.01); *B29C 70/527* (2013.01); *B29C 70/545* (2013.01);
(Continued)

(58) Field of Classification Search
CPC ... B29C 70/526; B29C 70/527; B29C 70/545; B29C 70/382; B29C 64/147;
(Continued)

(56) References Cited

U.S. PATENT DOCUMENTS 4,844,350 A * 7/1989 Larsson ................ B29B 13/022
241/DIG. 31
6,129,872 A 10/2000 Jang
(Continued)

FOREIGN PATENT DOCUMENTS

JP   H09141726 A   6/1997
WO  WO-2008/100467 A1  8/2008
(Continued)

OTHER PUBLICATIONS

Wang, F. et al., Fiber-matrix impregnation behaviour during additive manufacturing of continuous carbon fiber reinforced polylactic acid composites, Additive Manufacturing (2021) vol. 37, Article 101661, available online Oct. 15, 2020.
(Continued)

*Primary Examiner* — Nahida Sultana
*Assistant Examiner* — Lawrence D. Hohenbrink, Jr.
(74) *Attorney, Agent, or Firm* — Goodwin Procter LLP

(57) ABSTRACT

A soft material extruder including a housing having a cavity, an inlet configured to receive a material and an outlet. The extruder also includes a first intermeshed gear pair positioned in the cavity proximate the inlet, the first intermeshed gear pair that when driven is configured to draw material from the inlet into the cavity, a heating element positioned
(Continued)

in the cavity proximate the outlet, wherein the heating element is configured to melt material in the vicinity of the outlet and a second intermeshed gear pair positioned in the cavity proximate the outlet, the second intermeshed gear pair forming a gear pump that when driven is configured to push molten material towards the outlet so that molten material is expelled from the outlet.

9 Claims, 3 Drawing Sheets

(51) Int. Cl.
| | | |
|---|---|---|
| B29C 48/37 | (2019.01) | |
| B29C 64/118 | (2017.01) | |
| B29C 64/147 | (2017.01) | |
| B29C 64/209 | (2017.01) | |
| B29C 64/321 | (2017.01) | |
| B29C 70/38 | (2006.01) | |
| B33Y 10/00 | (2015.01) | |
| B33Y 30/00 | (2015.01) | |

(52) U.S. Cl.
CPC ............. *B29C 48/37* (2019.02); *B29C 64/118* (2017.08); *B29C 64/147* (2017.08); *B29C 64/209* (2017.08); *B29C 64/321* (2017.08); *B29C 70/382* (2013.01); *B29C 70/52* (2013.01); *B33Y 10/00* (2014.12); *B33Y 30/00* (2014.12)

(58) Field of Classification Search
CPC ... B29C 64/209; B29C 64/321; B29C 64/118; B29C 48/37; B29C 15/14; B29C 15/122; B33Y 10/00; B33Y 30/00
USPC ......................................................... 425/162
See application file for complete search history.

(56) References Cited

U.S. PATENT DOCUMENTS

| | | | |
|---|---|---|---|
| 9,102,098 | B2 | 8/2015 | Dilworth et al. |
| 2009/0166915 | A1* | 7/2009 | Uchida .................. B29C 48/49 |
| | | | 264/176.1 |
| 2012/0070615 | A1 | 3/2012 | Shi et al. |
| 2013/0106011 | A1 | 5/2013 | Amurri |
| 2015/0174824 | A1 | 6/2015 | Gifford et al. |
| 2016/0185012 | A1 | 6/2016 | Treffer et al. |
| 2017/0210074 | A1* | 7/2017 | Ueda ...................... B33Y 50/02 |
| 2018/0154586 | A1 | 6/2018 | Wang et al. |

FOREIGN PATENT DOCUMENTS

| | | |
|---|---|---|
| WO | WO-2014/153535 A2 | 9/2014 |
| WO | WO-2016/014543 A1 | 1/2016 |
| WO | WO-2018/017295 A1 | 1/2018 |
| WO | WO-2020/102569 A3 | 7/2020 |

OTHER PUBLICATIONS

Quan Z. et al., Additive manufacturing of multi-directional preforms for composites: opportunities and challenges, Materials Today, vol. 18, No. 9, Nov. 2015, pp. 503-512.

Australian Patent Office Search Report and Written Opinion issued for AU Application No. 2020904207, dated Dec. 14, 2020.

* cited by examiner

MATERIAL EXTRUDER

CROSS-REFERENCE TO RELATED APPLICATIONS

This patent application claims priority to and the benefit of Australian Patent Application Number 2020904207 entitled "Material Extruder" filed on Nov. 16, 2021, the subject matter of which is incorporated by reference herein in its entirety.

BACKGROUND OF THE INVENTION

The present invention relates to a material extruder for extruding material, and in one particular example, to an extruder for use in an additive manufacturing process.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Additive manufacturing, also known as 3D (three-dimensional) printing, is a process that involves constructing a three-dimensional object from a digital model, such as a CAD model. Typically Fused Fillament Fabrication (FFF) 3D printers receive a filament of material that is heated to create molten material, which is then delivered through a movable nozzle, allowing the material to be deposited in layers to thereby construct objects. Arrangements of this form typically operate by pushing material through the nozzle and as a result are limited to printing using semi-rigid filament materials. Additionally, arrangements of this form are also typically limited to printing using single a type of material at any one time.

"Additive manufacturing of multi-directional preforms for composites: opportunities and challenges" by Zhenzhen Quan, Amanda Wu, Michael Keefe, Xiaohong Qin, Jianyong Yu, Jonghwan Suhr, Joon-Hvung Byun, Byung-Sun Kim and Tsu-Wei Chou in Materials Today May 2015 describes the additive manufacture of multi-directional composite preforms, including through the use of a co-extrusion process.

SUMMARY OF THE PRESENT INVENTION

In one broad form, an aspect of the present invention seeks to provide a soft material extruder including: a housing having: a cavity; an inlet configured to receive a material; and, an outlet; a first intermeshed gear pair positioned in the cavity proximate the inlet, the first intermeshed gear pair that when driven is configured to draw material from the inlet into the cavity; a heating element positioned in the cavity proximate the outlet, wherein the heating element is configured to melt material in the vicinity of the outlet; and, a second intermeshed gear pair positioned in the cavity proximate the outlet, the second intermeshed gear pair forming a gear pump that when driven is configured to push molten material towards the outlet so that molten material is expelled from the outlet.

In one embodiment the first and second intermeshed gear pairs are interconnected a third gear pair positioned at least partially between and outwardly of the first and second gear pairs.

In one embodiment first and third and third and second gear pairs are intermeshed to prevent backflow of material from the outlet towards the inlet.

In one embodiment an overlap of the first and third and third and second gear pairs is greater than an overlap of the first gear pair and the second gear pair.

In one embodiment the cavity is shaped to conform to an outer profile of the gear pairs.

In one embodiment the heating element extends laterally from the outlet along an inner wall of the cavity.

In one embodiment the heating element extends along the inner wall of the cavity at least part way round the second gear pair.

In one embodiment the heating element includes a copper member extending from a heater block positioned downstream of the outlet.

In one embodiment the copper member is mounted on an insulating member mounted on an inner wall of the cavity.

In one broad form, an aspect of the present invention seeks to provide a material extruder including a heated impregnation block having: an inlet configured to receive a tow of feedstock material; an outlet configured to supply a tow of impregnated feedstock material; a channel extending from the inlet to the outlet; a number of matrix inlets in communication with the channel; each matrix inlet being configured to receive a matrix material from a material extruder and supply matrix material into the channel; a working mechanism provided in the channel downstream of the number of matrix inlets that is configured to work the matrix material into the tow so the tow includes feedstock material impregnated with matrix material.

In one embodiment the extruder includes a plurality of matrix inlets, at least some of the matrix inlets being configured to supply different matrix materials.

In one embodiment the extruder includes a plurality of matrix inlets circumferentially spaced around the channel.

In one embodiment the working mechanism includes at least one of: a bend in the channel; an S-shape in the channel; and, a chicane in the channel.

In one embodiment the working mechanism includes: at least one roller; and, a pair of offset rollers.

In one embodiment the extruder includes a cooling mechanism downstream of the outlet to cool the impregnated tow material.

In one embodiment the extruder includes a puller configured to pull the tow through the extruder.

In one embodiment the extruder includes a cutter configured to cut the tow.

In one embodiment the extruder includes: a heater block configured to heat the impregnated tow; and, a nozzle configured to dispense the impregnated feedstock material.

In one embodiment the extruder includes a controller configured to control the material extruders to selectively extrude matrix material into the channel.

In one embodiment the controller is configured to at least one of: progressively alter the matrix material impregnated into the tow; and, discretely alter the matrix material impregnated into the tow.

In one embodiment the matrix material is a soft matrix material and the material extruder is a soft material extruder according to the first aspect.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
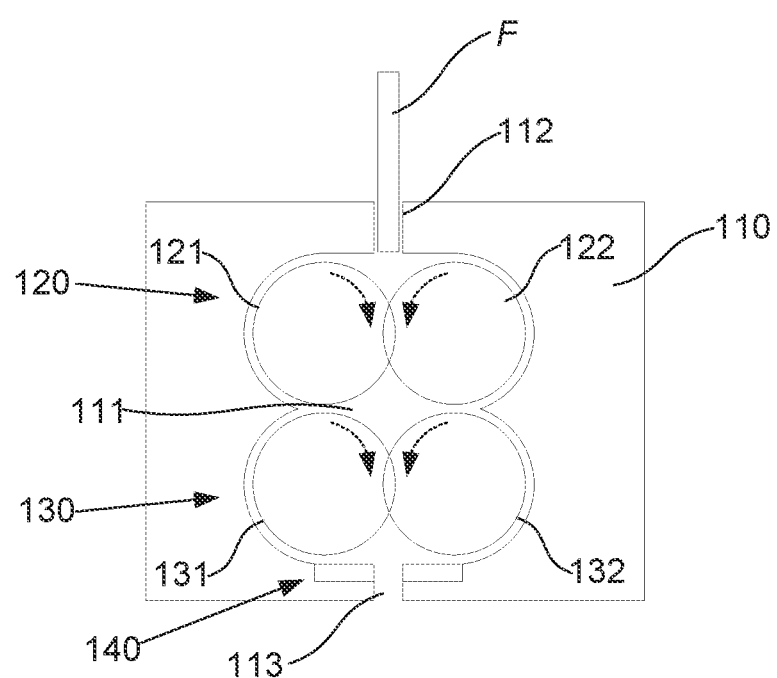
FIG. 1 is a schematic side view of an example of a soft material extruder.

An example of a soft material extruder will now be described with reference to FIG. 1.

In this example, the soft material extruder 100 includes a housing 110 having a cavity 111, an inlet 112 configured to receive a material and an outlet 113. The material is typically in the form of a filament F of a soft rubber, gel, or other similar material.

A first intermeshed gear pair 120, including gears 121, 122, is positioned in the cavity proximate the inlet 112. The first intermeshed gear pair 120 is configured so that when driven in the direction of the dotted arrows, the gears 121, 122 act to draw material from the inlet 112 into the cavity 111.

A heating element 140 is positioned proximate the outlet 113; with the heating element being configured to melt material in the vicinity of the outlet 113. The heating element could be of any appropriate form, and could for example include a heater block embedded in the cavity wall or located in the cavity.

A second intermeshed gear pair 130, including gears 131, 132 is positioned in the cavity proximate the outlet 113, with the second intermeshed gear pair 130 forming a gear pump that when driven in the direction of the dotted arrows is configured to push molten material towards the outlet 113 so that molten material is extruded from the outlet.

Accordingly, it will be appreciated that the above described arrangement provides an extruder that is capable of extruding a soft material, such as molten rubber, gel, or similar. In particular, the arrangement uses two gear pairs, a first of which draws material into a cavity allowing the material to be heated, and a second of which acts as a pump, thereby pumping molten material from an outlet. This allows the molten material to be extruded for use, for example, allowing material to be used in a 3D printing application.

A number of further features will be described.

In this example, in order to prevent material driven towards the outlet 113 flowing back into the cavity 111, the cavity 111 is shaped to conform to an outer profile of the gear pairs 110, 120, limiting the ability of the material to flow between the gears 121, 122, 131, 132 and the cavity wall, so that material is preferentially directed through the outlet 113.

Figure 2:
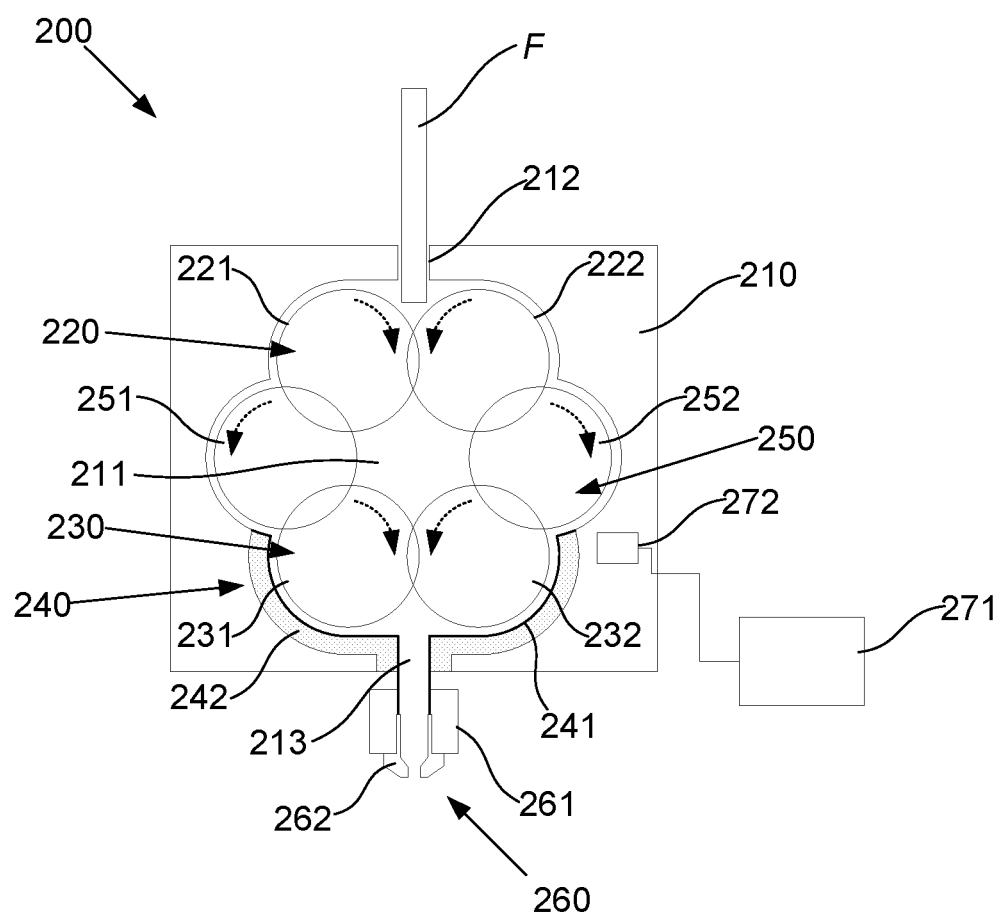
FIG. 2 is a schematic side view of a second example of a soft material extruder; and, FIG. 3 is a schematic side view of an example of a composite material extruder.

A second example of a soft material extruder will now be described with reference to FIG. 2.

In this example, the extruder 200 again includes a housing 210 having a cavity 211, an inlet 212 and an outlet 213, with first and second intermeshed gear pairs 220, 230 positioned in the cavity 211 proximate the inlet 212 and outlet 213 respectively. A heating element 240 is positioned in the cavity 211 proximate the outlet 213. It will therefore be appreciated that this functions broadly in a manner similar to that described above.

In this example, the first gear pair 220 includes partially intermeshed gears 221, 222, which act by having the incoming filament F of material entrained between the intermeshing gears 221, 222, so that the material is drawn in through the inlet 212. Similarly, the second gear pair 230 includes partially intermeshed gears 231, 232, which act as a drive pump so that molten material entrained between the intermeshing gears 231, 232, is driven towards the outlet 213.

In this example, the first and second intermeshed gear pairs 220, 230 are interconnected via a third gear pair 250, including gears 251, 252 positioned at least partially between and outwardly of the first and second gear pairs 220, 230. The inclusion of the third gear pair 250 can provide a number of advantages.

For example, the third gears 251, 252 rotate in a direction counter to that of the first and second gears 221, 222, 231, 232, allowing rotational force to be transmitted between the first and second gear pairs 220, 230. This in turn allows the gear arrangement to be driven by a single drive, rather than requiring independent drives for the first and second gear pairs.

Additionally, the intermeshing of the first and third gear pairs 220, 250 and third and second gear pairs 250, 230 can help prevent backflow of material from the outlet 213 towards the inlet 212. In this regard, the degree of overlap between the first and third gear pair 220, 250 and third and second gear pair 250, 230 is greater than an overlap between gears 221, 222 of the first gear pair 220 and the gears 231, 232 of the second gear pair 230. This in effect prevents material passing between the first and third gears 221, 251; 222, 252 and third and second gears 251, 231; 252, 232, whilst allowing material to pass between the first gears 221, 222 and the second gears 231, 232, thereby preferentially directing material towards the outlet 213.

In this example, the heating element 240 extends laterally from the outlet 213 along an inner wall of the cavity 211, and preferably at least part way round the second gear pair 230, thereby ensuring material in the vicinity of the outlet 213 is melted. In general, material is melted in a volume extending to a point approximately half-way between the inlet 212 and outlet 213, and in particular between the first and second gear pairs 220, 230, so the second gear pair is immersed in molten material, thereby helping ensure operation of the pumping action of the second gear pair 230. However, it will be appreciated that this is not essential and alternatively, heating may occur over a greater, or lesser volume.

In this example, the heating element 240 includes a copper body 241, such as a relatively thick laminar copper sheet, extending from a heater block 261 positioned downstream of the outlet. In this regard, the heater block 261 can form part of a 3D print head 260, including a nozzle 262. This allows an existing heat source to be used, with heat being conducted by the copper body 261 into the cavity 211, allowing the material to be melted without requiring an additional heat source. In this example, the copper body 241 can be supported on an insulating material 242, mounted on an inner wall of the cavity 211, thereby reducing heat loss to the environment, and maintaining heat transfer to the material.

Operation of the soft material extruder is relatively straightforward and typically merely, requires control of a drive (not shown), such as a stepper motor, coupled to one of the gear pairs 220, 230, 250, allowing the gears to be rotated as required. This is typically achieved using a controller 271, configured to control operation of the drive. The controller could be of any appropriate form but in one example is a processing system that executes software applications stored on non-volatile (e.g., hard disk) storage, although this is not essential. However, it will also be understood that the controller could be any electronic processing device such as a microprocessor, microchip processor, logic gate configuration, firmware optionally associated with implementing logic such as an FPGA (Field Programmable Gate Array), or any other electronic device, system or arrangement.

In one example, the extruder includes a temperature sensor, such as a thermistor 272, which can be coupled to the controller 271, allowing control of the drive to be performed at least partially based on a temperature within the cavity 211. For example, this can be used to increase or decrease a rate of extrusion of the molten material, depending on the temperature and hence degree of melting of the material. For example, if the material temperature falls, an extrusion rate can be decreased so that the material undergoes additional heating, thereby ensuring the material remains molten. In addition, as the stepper motor is used, in the event that the material is heated insufficiently, and hence is too viscous, the stepper motor will typically skip steps, hence allowing the material to undergo additional heating.

Figure 3:
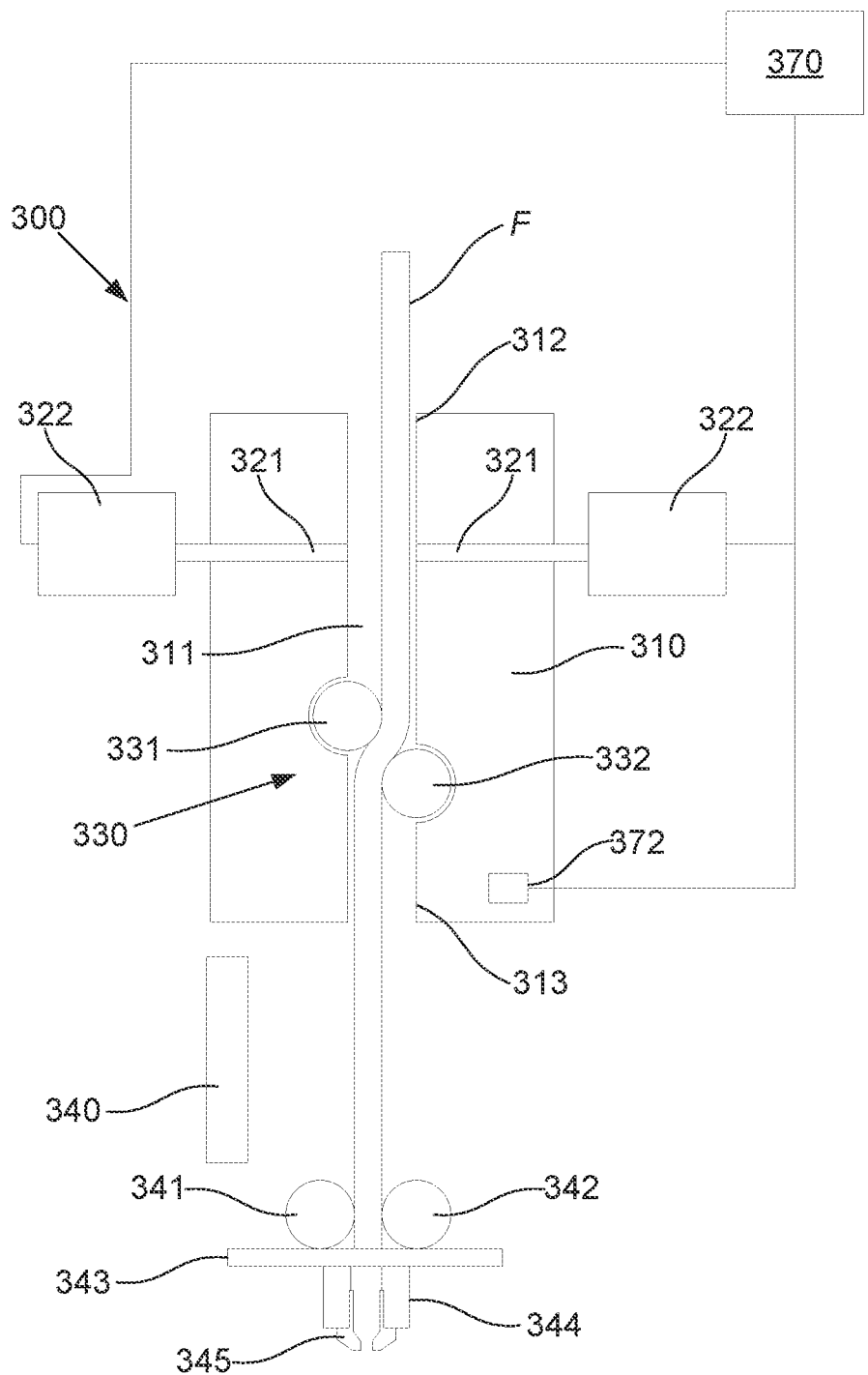

An example of a material extruder for extruding impregnated material will now be described with reference to FIG. 3.

In this example, the extruder 300 includes a heated impregnation block 310 having an inlet 312 configured to receive a tow of material typically including multiple parallel fibres, an outlet 313 configured to supply a tow of impregnated material, and a channel 311 extending from the inlet 312 to the outlet 313. A number of matrix inlets 321 are provided in communication with the channel, with each matrix inlet being configured to receive a matrix material from a material extruder 322. The matrix material could be a soft matrix material, in which case material extruder 322 could be an extruder 100, 200 similar to those described above, a gear pump, or other similar arrangement. However, this is not essential, and it will be appreciated that hard matrix materials could also be used. The matrix inlets 321 then supply matrix material into the channel 311.

A working mechanism 330 is provided in the channel downstream of the number of matrix inlets that is configured to work the matrix material into the tow, so the tow includes material impregnated with matrix material.

Accordingly, in this arrangement, the combination of the matrix inlets 321 that supply matrix material into the channel 311 containing the tow, and the working mechanism, allows a tow to be impregnated with the matrix material. The impregnated tow can then be supplied to a printhead of a 3D printer, or other similar arrangement, allowing the impregnated material to be used in 3D printing. This allows a wide range of different matrix materials to be combined with a tow of feedstock material and used in 3D printing, with the resulting material having different properties depending on the matrix materials used.

Additionally, the use of multiple matrix inlets 321 allows multiple different matrix materials to be used. This allows matrix materials to be changed during use, for example allowing a change in composition of the printing material to be achieved mid-way through printing. This also allows matrix materials to be used in combination, for example, allowing different ratios of multiple matrix materials to be used in order to be achieved desired resulting properties. Furthermore, changes in matrix materials can be made progressively, allowing changing material properties to be achieved gradually along a length of the tow. This enables a wide range of different material properties to be achieved using a single printing or other similar arrangement.

The above arrangement can be used with a variety of different matrix materials, and could include rubbers, polymers or gels. Matrix materials could contain fibres, for example to form fibre impregnated epoxies, or could include particles, such as ferrous or ferromagnetic particles; allowing magnetic properties of the resulting material to be adjusted. The matrix materials might include polymers with different main/side chain lengths or additives, and could include both thermoset or thermoplastic matricies, allowing a wide range of varying properties to be achieved.

A number of further features will ow be described.

The matrix inlets 321 could be provided with any suitable arrangement. For example, the number of matrix inlets 321 provided could be varied, so whilst two matrix inlets 321 are shown in FIG. 3, any number of one or more matrix inlets could be used. In one example, a plurality of matrix inlets 321 are provided, with at least some of the matrix inlets being configured to supply different matrix materials. The matrix inlets 321 could be circumferentially spaced around the channel 311, which can assist in ensuring even distribution of matrix material in the channel. The matrix inlets 3231 could also be arranged perpendicularly relative to the channel 311, or may enter the channel at an angle relative to an axis of the channel, for example, allowing matrix material to flow downwardly into the channel 311.

In one example, the working mechanism includes a bend in the channel, and more typically an S-shape or chicane in the channel. This arrangement ensures that the matrix material and tow are urged together within the channel, ensure the matrix material is forced into the tow, thereby ensuring the tow material is impregnated. Additionally, this also helps retain the matrix material within the channel, so for example, this prevents the matrix material flowing out of the outlet 313.

Whilst the working mechanism, can be defined by shaping of side walls of the channel; this is not essential, and in other examples, the working mechanism includes at least one roller, and more typically a pair of offset rollers 331, 332, that cooperate to define a chicane.

In this example, the extruder includes a cooling mechanism, such as a fan 340, positioned downstream of the outlet 313, to cool the impregnated tow, and a puller, such as a pair of hob rollers 341, 342 configured to pull the tow through the extruder. A cutter 343 can be provided to cut the tow, with a printhead including a heater block 344 to heat the impregnated tow and a nozzle 345 configured to dispense the impregnated feedstock material.

Operation of the extruder is typically performed using a controller that controls the fan 340, puller 341/342 and cutter 343, as well as the material extruders 322, allowing the controller to control the rate of impregnation of the tow by different matrix materials. The controller 370 may also be coupled to a sensor such as thermistor or similar, allowing operation of the extruder to be monitored. These arrangements allow the controller to progressively alter the matrix material impregnated into the tow and/or alter the matrix discretely, effectively transitioning the matrix material in a stepwise fashion.

Again the controller could be of any appropriate form but in one example is a processing system that executes software applications stored on non-volatile (e.g., hard disk) storage, although this is not essential. However, it will also be understood that the controller could be any electronic processing device such as a microprocessor, microchip processor, logic gate configuration, firmware optionally associated with implementing logic such as an FPGA (Field Programmable Gate Array), or any other electronic device, system or arrangement.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A soft material extruder including:
   a) a housing having:
      i) a cavity;
      ii) an inlet configured to receive a material; and,
      iii) an outlet;
   b) a first intermeshed gear pair positioned in the cavity proximate the inlet, the first intermeshed gear pair that when driven is configured to draw the material from the inlet into the cavity;
   c) a heating element positioned in the cavity proximate the outlet, wherein the heating element is configured to melt the material to form a molten material in the vicinity of the outlet; and,
   d) a second intermeshed gear pair positioned in the cavity proximate the outlet, the second intermeshed gear pair forming a gear pump that when driven is configured to push the molten material towards the outlet so that the molten material is expelled from the outlet.

2. A soft material extruder according to claim 1, wherein the first and second intermeshed gear pairs are interconnected via a third gear pair positioned at least partially between and outwardly of the first and second gear pairs.

3. A soft material extruder according to claim 2, wherein the first and third gear pairs and the third and second gear pairs are intermeshed to prevent backflow of material from the outlet towards the inlet.

4. A soft material extruder according to claim 2, wherein an overlap of the gears of the first and third gear pairs and the gears of the third and second gear pairs is greater than an overlap of the gears of the first gear pair and the second gear pair.

5. A soft material extruder according to claim 1, wherein the cavity is shaped to conform to an outer profile of the gear pairs.

6. A soft material extruder according to claim 1, wherein the heating element extends laterally from the outlet along an inner wall of the cavity.

7. A soft material extruder according to claim 6, wherein the heating element extends along the inner wall of the cavity at least part way round the second gear pair.

8. A soft material extruder according to claim 1, wherein the heating element includes a copper member extending from a heater block positioned downstream of the outlet.

9. A soft material extruder according to claim 8, wherein the copper member is mounted on an insulating member mounted on an inner wall of the cavity.

* * * * *